US008300916B2

(12) United States Patent
Strong

(10) Patent No.: US 8,300,916 B2
(45) Date of Patent: Oct. 30, 2012

(54) BANKNOTE VALIDATOR

(75) Inventor: Matthew Strong, Oldham (GB)

(73) Assignee: Innovative Technology Limited, Oldham (GB)

( * ) Notice: Subject to any disclaimer, the term of this patent is extended or adjusted under 35 U.S.C. 154(b) by 307 days.

(21) Appl. No.: 12/850,656

(22) Filed: Aug. 5, 2010

(65) Prior Publication Data

US 2011/0188729 A1 Aug. 4, 2011

(30) Foreign Application Priority Data

Aug. 7, 2009 (GB) .................................. 0913798.5

(51) Int. Cl.
*G06K 9/00* (2006.01)
*G06K 9/74* (2006.01)

(52) U.S. Cl. .......................... 382/137; 382/274; 356/71

(58) Field of Classification Search .......... 382/100–103, 382/106, 112–114, 135–140, 154, 155, 168, 382/170, 173, 181, 184–189, 209, 232, 254, 382/276, 284–294, 305, 312, 321, 274; 356/71; 235/454; 362/231

See application file for complete search history.

(56) References Cited

U.S. PATENT DOCUMENTS

| | | | | |
|---|---|---|---|---|
| 5,680,935 | A | 10/1997 | Mistander et al. | |
| 5,719,948 | A | 2/1998 | Liang | |
| 5,966,456 | A * | 10/1999 | Jones et al. | 382/135 |
| 6,028,951 | A * | 2/2000 | Raterman et al. | 382/135 |
| 6,991,347 | B2 * | 1/2006 | Voser | 362/231 |
| 7,218,386 | B2 * | 5/2007 | Alcock et al. | 356/71 |
| 7,353,994 | B2 * | 4/2008 | Farrall et al. | 235/454 |
| 7,995,196 | B1 * | 8/2011 | Fraser | 356/71 |
| 8,159,657 | B2 * | 4/2012 | Degott et al. | 356/71 |
| 2003/0210386 | A1 | 11/2003 | Laskowski | |
| 2004/0093117 | A1 | 5/2004 | Daout et al. | |
| 2005/0183927 | A1 | 8/2005 | Aas et al. | |
| 2006/0039593 | A1 | 2/2006 | Sammak et al. | |
| 2008/0060906 | A1 | 3/2008 | Fitzgerald et al. | |
| 2009/0101723 | A1 | 4/2009 | Uehara et al. | |

FOREIGN PATENT DOCUMENTS

| | | |
|---|---|---|
| EP | 0 537 513 A1 | 4/1993 |
| EP | 0 622 762 | 11/1994 |
| EP | 0 660 277 | 1/1999 |
| EP | 0 991 029 | 4/2000 |
| EP | 0 738 408 | 9/2002 |
| WO | WO 03/063098 | 7/2003 |

OTHER PUBLICATIONS

European Search Report—App. No. 10 275 081.7, Feb. 22, 2000.

* cited by examiner

*Primary Examiner* — Seyed Azarian
(74) *Attorney, Agent, or Firm* — Woodard, Emhardt, Moriarty, McNett & Henry LLP

(57) ABSTRACT

Apparatus for checking the validity of a banknote wherein a light source illuminates a banknote through a slit as it is transported along a note path, the emitted light being detected at different wavelengths to generate a plurality of images such that a three dimensional matrix can be created, for comparison against matrices of authentic banknotes.

15 Claims, 3 Drawing Sheets

BANKNOTE VALIDATOR

REFERENCE TO RELATED APPLICATIONS

The present application claims the benefit of UK Patent Application Serial No. 0913798.5, filed 7 Aug. 2009; which is hereby incorporated by reference.

The invention relates to apparatus and a method which allows for the improved checking on the validity, or otherwise of banknotes, bills, vouchers or the like and which are hereinafter referred to in a non limiting manner as banknotes.

Increasingly payment for services such as parking, gaming and the like is paid for by the insertion of banknotes into apparatus which is part of or is linked to means for providing or facilitating the desired service. The insertion of the banknotes means that there is a need for the apparatus to be able to validate the banknotes and check that the inserted banknote is legal tender and meets the required payment value. If the banknote is validated then the payment is accepted and the service can be provided. However, if the banknote is identified as not being valid then provision of the service is prevented.

It is known to provide apparatus which allows the validity of the banknote to be checked but it is found that the existing apparatus in many cases may not be sufficiently efficient or accurate so as to provide a sufficiently reliable check on the validity of the banknote. It is also known to use the detection of a particular image wavelength of a banknote as a means of assisting the validity check, but the check is typically linked to a single wavelength which limits the use of this check.

The overall aim of this invention is to provide an improved means by which a plurality of wavelengths of the image of a banknote can be checked in order to allow the validity of the banknote to be identified and to allow the validity check to still be achieved in a manner and time which is suitable for use in automated telling apparatus.

In an aspect of the invention there is provided apparatus for checking the validity of a banknote, said apparatus including:

a light source for illuminating the banknote with a plurality of wavelengths of light;

an aperture through which the illuminating light passes to reach a portion of the banknote;

imaging means for detecting light reflected or transmitted by the banknote at least one wavelength;

said imaging means generating at least one image representing said portion from said reflected or transmitted light;

characterised in that a note path is provided along which the banknote to be validated is passed to expose a plurality of portions of the banknote to the illuminating light via said aperture when each of said portions is presented to the aperture.

Typically the imaging means generate an image for each of the portions and processing means are provided to combine the images to create a representation of the banknote. It will be appreciated that the processing means may be formed as part of the imaging means.

In one embodiment the banknote is moved substantially continuously along the note path past the aperture. Typically the images are generated sequentially from the exposed portions of the banknote. Thus a representation of the whole banknote is built up as the note is passed along the note path.

In one embodiment each portion is represented by a plurality of images which relate to a plurality of wavelengths detected for that portion.

In one embodiment the images which are created are sufficient to create a representation in the form of a three dimensional matrix whereby two coordinates of the matrix relate to the x and y coordinates of the bank note respectively and the third coordinate of the matrix relates to the wavelength at which the banknote has been imaged, typically the intensity of a particular imaging wavelength.

In a further embodiment the images are used to create a representation in the form of a three dimensional matrix whereby the coordinates of the matrix relate to the longitudinal coordinate of the bank note, the wavelength spectral range detectable, and the intensity of the light detected.

In one embodiment illumination optics are provided to ensure a substantially uniform illumination of the aperture, typically adjacent to and acting on the note path.

In one embodiment if the chosen light-source emits light over a relatively large spatial range, the emitted light can be focused onto the aperture by the illumination optics in order to achieve an acceptable illumination intensity.

In one embodiment the light source consists of a single source, such as a spectrally broadband bulb/lamp, or can be a composite of a number of elements, a number of LEDs, or other light-sources making up the spectral range required.

Typically the light source is a polychromatic light source.

In one embodiment, the light source used defines the range of wavelengths that can be detected by the imaging means.

In one embodiment the images which are generated are images at all wavelengths contained within the polychromatic light-source.

In one embodiment the images which are selected to be generated are those which are relevant to detecting known optical security features provided on the banknotes.

In one embodiment the illumination optics include a lens or mirror, or could be a composite lens/mirror assembly.

Typically, the aperture is an elongate slit having a width of around 1 mm or less.

In one embodiment the slit defines the maximum y-axis (long-edge) spatial resolution of the spectral imaging as the width of the slit defines the minimum pixel size of the y-direction of the spectrally imaged banknote. The width of the slit also has an effect on the spectral resolution of the spectral imaging.

In one embodiment the apparatus includes collection optics to collect the light that is reflected/transmitted from the banknote and re-focus it onto a diffractive element to achieve the highest spatial and spectral resolution possible.

In one embodiment the collection optics includes a single lens or mirror, or alternatively are a composite assembly of multiple lenses and mirrors.

In one embodiment the apparatus includes a diffractive element to split the incident light reflected/transmitted from the banknote into its constituent wavelengths. The diffractive element determines the spectral resolution of the unit.

In one embodiment the diffractive element is selected from a prism, diffraction grating, grism or any other diffractive component.

Typically the apparatus includes re-imaging optics to receive the light from the diffractive element and focus it onto the imaging means.

In one embodiment the imaging means is a detector which images the light incident on it and generates the x-coordinates (short-edge) of the spectral image, and the z-coordinates (wavelength) for each slit.

In a further embodiment the detector images the light incident on it and determines the light intensities across a wavelength range for each slit.

In one embodiment the imaging means includes a scanning head for detecting a range of wavelengths at different positions across the banknote. Thus the detector scans the light at different along the slot to determine the intensity of light at different wavelengths across the x-axis of the banknote.

Typically the y-coordinate of the spectral image cube which is generated comprises a plurality of slits images.

In one embodiment the detector is selected from any of a CCD, CMOS or photodiode.

In one embodiment, movement means are provided for transporting the banknote along the note path. Typically the movement means includes an electric motor, although it will be appreciated that any drive unit could be used.

In one embodiment there is provided apparatus for checking the validity of a banknote, said apparatus including:

- a light source for illuminating the banknote with different wavelengths of light;
- a note path along which the banknote to be validated is passed;
- imaging means for detecting light emitted at different wavelengths and providing a plurality of images of the banknote;
- characterised in that the note path includes a slit which allows the light to pass onto the banknote at a plurality of positions.

In a further aspect of the invention there is provided a method for checking the validity of a banknote, said method comprising the steps of:

- transporting a banknote along a note path;
- illuminating a portion of the banknote, via an aperture, with a plurality of wavelengths of light;
- detecting light reflected or transmitted by the banknote at at least one wavelength;
- generating at least one image representing said portion from said reflected or transmitted light
- characterised in that the banknote is passed along a note path to expose a plurality of portions of the banknote to the illuminating light via said aperture.

Typically the light source is a polychromatic light source.

In one embodiment the method is a hyper-spectral imaging method which results in the banknote being imaged in a broad range of wavelengths.

In one embodiment the range of wavelengths is selected with respect to the waveband of the emitting light-source, the quality of the diffracting optics and/or the number of linear pixels on the detecting element.

Typically an image is generated for each of the portions, and the images are combined to create a representation of the banknote In one embodiment the images are used to create a representation in the form of a three dimensional matrix whereby two coordinates of the matrix relate to the x and y coordinates of the bank note respectively and the third coordinate of the matrix relates to the wavelength at which the banknote has been imaged, typically the intensity of a particular imaging wavelength.

In a further embodiment the images are used to create a representation in the form of a three dimensional matrix whereby the coordinates of the matrix relate to the longitudinal coordinate of the bank note, the wavelength spectral range detectable, and the intensity of the light detected.

In a further embodiment there is provided a method for checking the validity of a banknote, said method comprising the steps of:

- transporting a banknote along a note path;
- illuminating the banknote and detecting the wavelengths of light emitted therefrom;
- generating a plurality of images of the banknote relating to the wavelengths detected;
- characterised in that the images are generated for different longitudinal positions along the banknote from light passing through a slit in the note path.

Specific embodiments of the invention are now described with reference to the accompanying figures; wherein FIG. 1 illustrates a schematic view of an embodiment of the current invention;

Figure 1:
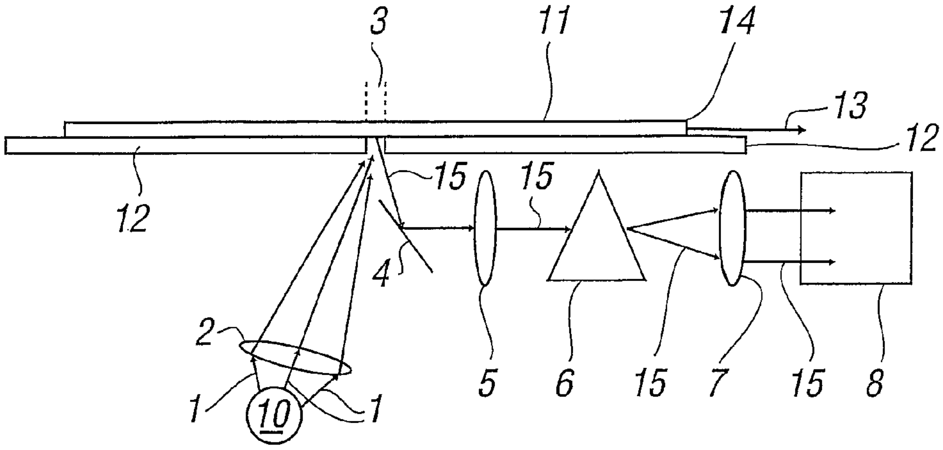

Referring firstly to FIG. 1 there is illustrated, in a schematic manner, the apparatus and method of a first embodiment of the invention. Light 1 is emitted from a light source 10. The light source 10 which is used is preferably a broadband light-source which provides as much of the electromagnetic spectrum as is required for the particular validity checks which are to be performed on the banknote. The light-source defines the range of wavelengths that can be detected by the scanner or other imaging means. The light source should be chosen carefully in order to ensure the apparatus operates to provide the required validity check. For example, the light source can consist of a single source, e.g. a spectrally broadband bulb/lamp, or can be a composite of a number of elements, e.g. a number of LEDs, or other light-sources making up the spectral range required.

The emitted light 1 is focused onto an aperture in the form of slit 3 in a note-path 12 by means of illuminating optics 2. The note-path defines the area along which the banknote 11 moves, and must be sufficiently flat to achieve good spectral imaging. The illumination optics ensure a uniform illumination of the note-path slit 3. If the chosen light-source emits over a large spatial range, it may be necessary to focus the light onto the slit with these optics in order to achieve an acceptable illumination intensity. These optics may be a single lens or mirror, or could be a composite lens/mirror arrangement. However it should be appreciated that if the incident light source is sufficiently powerful, then the illuminating optics may not be required. The note-path slit 3 has a number of functions. Primarily it defines the y-axis (long-edge) spatial resolution of the spectral imaging by defining the area of the banknote 11 over which to integrate, i.e. the width of this slit defines the minimum pixel size of the y-direction of the spectrally imaged banknote. Typically, this width would be 1 mm or less. The width of this slit also has an effect on the spectral resolution of the spectral imaging.

The banknote 11 is driven along the note path by a motor-drive unit which is provided to move the note through the note-path 12 at a constant rate in direction 13 in order to achieve good spectral imaging. The drive unit typically takes the leading edge 14 of the banknote as it is passed into an aperture from externally of the apparatus, and then moves the banknote along the note path. If the banknote 11 is valid the drive unit will typically then advance the banknote to a storage means and, if not valid, may return the banknote to the input aperture.

The light path 15 which is reflected from the banknote is then redirected by means of a collection optic mirror 4 and set of optics 5 in order to focus it on the diffractive element 6. The function of the collection optics is to collect the light that is reflected/transmitted from the banknote and re-focus it onto the diffractive element 6 to give the highest spatial and spectral resolution possibly. The mirror 4 and/or optics 5 may not be required if the optical setup is such that the reflected light does not need to be redirected, or has sufficient intensity, to pass through the detecting optics.

The diffractive element, 6, can be a prism, diffraction grating or a grism or any other diffractive component. The purpose of the diffractive element is to split the incident light into its constituent wavelengths or spectrum. The diffractive element determines the spectral resolution of the unit. This spectrum, corresponding to reflected light from the note, under the slit, is then re-imaged by use of optics 7 onto imaging means in the form of a two-dimensional detecting element 8. The function of this set of optics 7 is to take the light from the diffractive element 6 and focus it onto the detector in order to achieve the highest resolution. These optics can be a single lens or mirror, or could be a composite of multiple lenses and mirrors. These optics may not be required if the diffracted light has a sufficient intensity and resolution to achieve the desired specification of spectral imaging.

In order to generate the images, the banknote 11 is driven over the slit 3 in the note path 12 by use of an electric motor, and the two-dimensional spectral images of the slit are taken sequentially. As spectral images of the whole note are built up, they can be processed to form a representation of the note, such as a three-dimensional array/matrix. The two-dimensional detector 8 images the light incident on it and, for example, gives the x-coordinates (short-edge) of the spectral image and the z-coordinates (wavelength), for each slit image along the length of the banknote. Multiple images of the slit can then be used to make up the y-coordinate of a spectral image cube.

This detected matrix can then be checked against a predetermined or known matrix for a valid version of the input banknote which is supposed to have been input. If the detected matrix matches the predetermined matrix then the banknote is validated. However if there is no match the banknote will be rejected.

Figure 2:
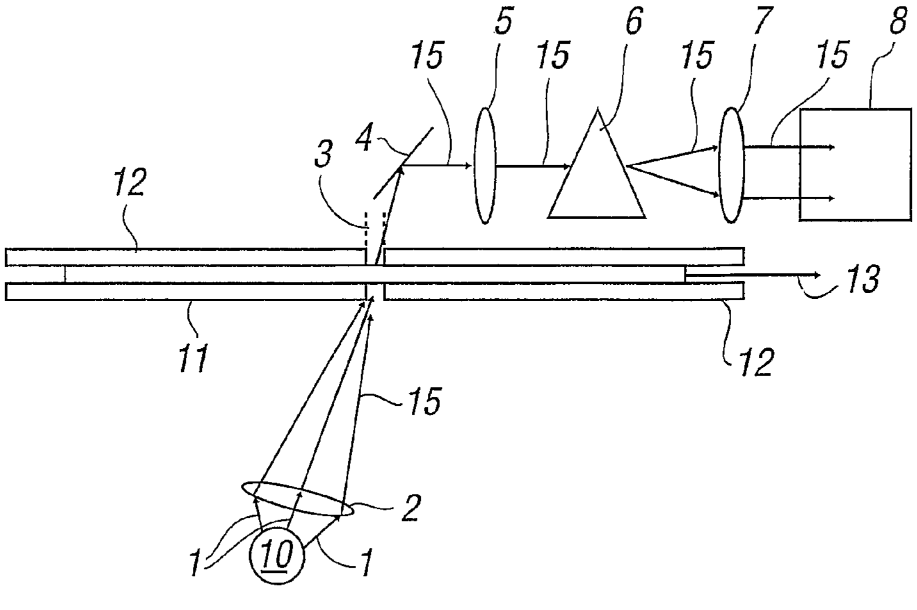
FIG. 2 illustrates a schematic view of a further embodiment of the invention.

FIG. 2 shows how the device can be set up in order to achieve transmission images rather than reflection and in which the light path 15 passes through the banknote 11 and two slits 3 in the notepaths 12. The same reference numerals are used for the same components.

Figure 3:
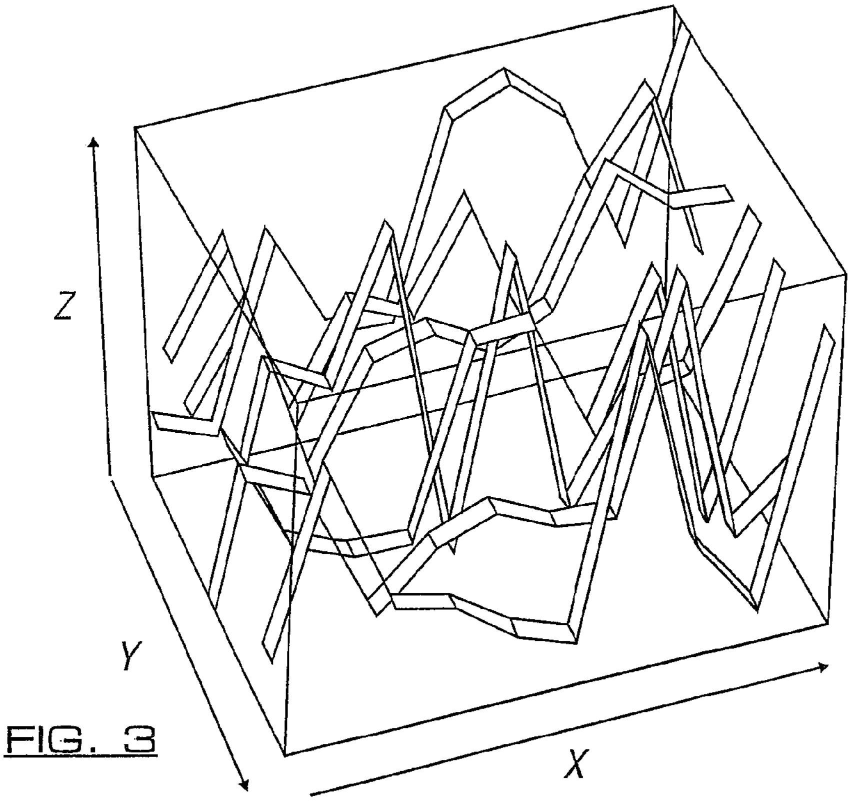
FIG. 3 illustrates a spectrographic matrix produced by an embodiment of the invention.

FIG. 3 illustrates a spectrographic matrix produced by an embodiment of the invention in which the x and y axes correspond to coordinates of the bank note, and the z axis represents the detected wavelength.

Alternatively the detecting element could be configured such that the x axis represents the wavelength, and the z axis represents the intensity of light detected.

In either case the y axis corresponds to slit images along the length of the banknote.

Figure 4:
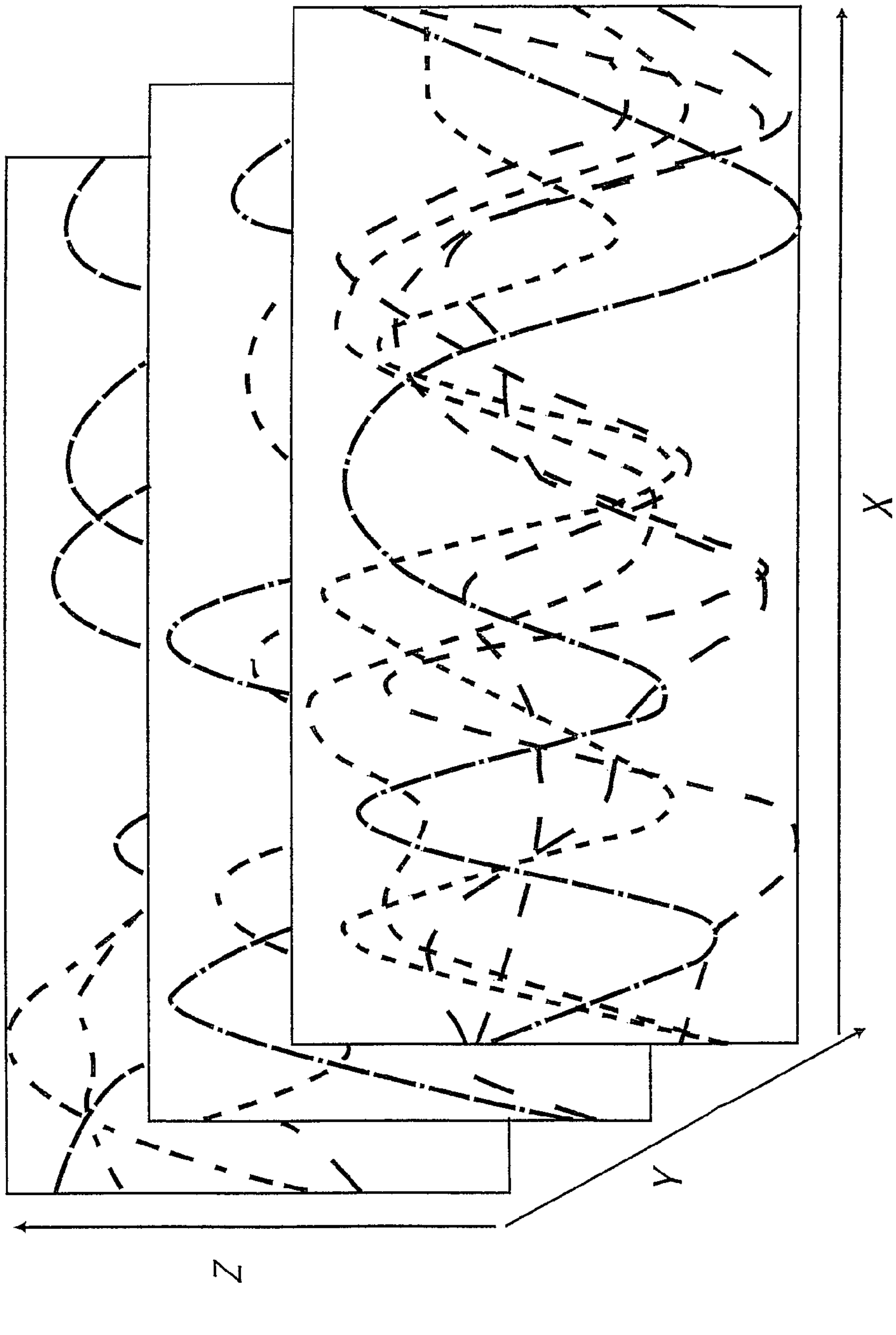
FIG. 4 illustrates a spectrographic matrix produced by a further embodiment of the invention.

FIG. 4 illustrates a spectrographic matrix produced by a further embodiment of the invention in which the x and y axes correspond to coordinates of the bank note, and the z axis represents the intensity of light detected. Thus for each y position (corresponding to a slit image), each line therein represents the intensity of a particular wavelength across the x axis (i.e. the width of the banknote).

Figure 5:
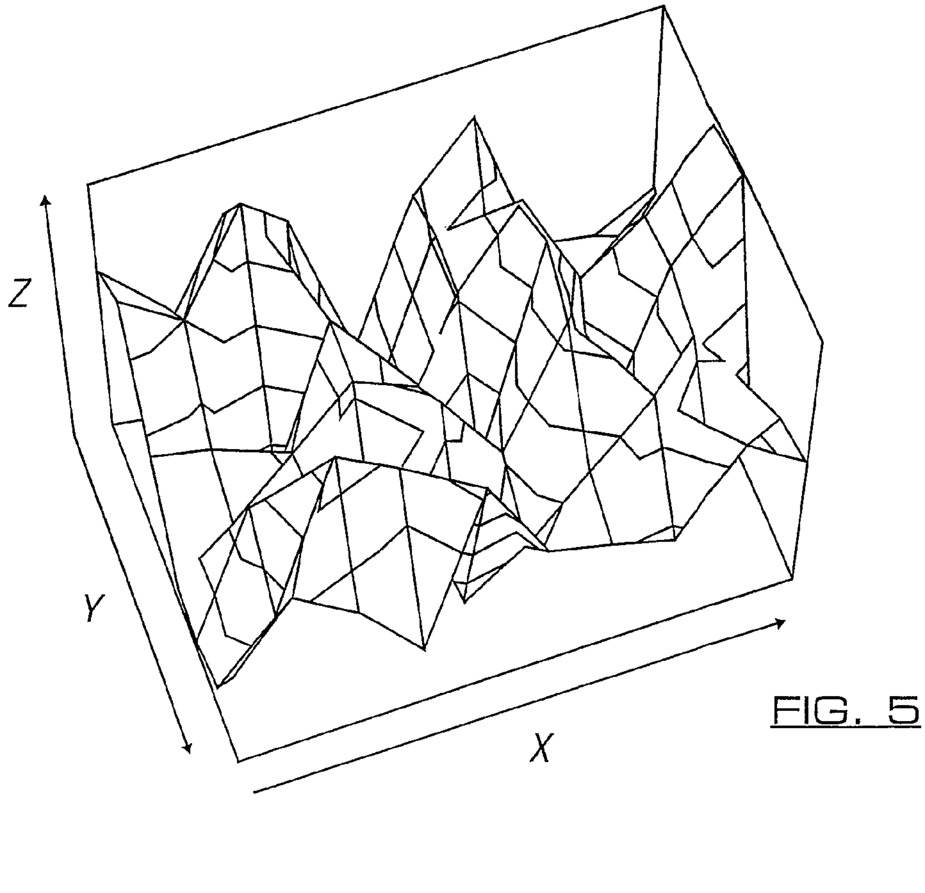
FIG. 5 illustrates a spectrographic matrix for a particular wavelength produced by the further embodiment of the invention.

FIG. 5 accordingly illustrates an intensity map of the banknote at a particular wavelength, where the x and y axes correspond to coordinates of the bank note, and the z axis represents the intensity of light detected at said coordinates.

Thus a banknote can be validated by comparing the detected spectrographic data against known authentic matrices.

The invention claimed is:

1. Apparatus for checking the validity of a banknote, said apparatus including:

a light source for illuminating the banknote with a plurality of wavelengths of light;

an aperture through which the illuminating light passes to reach a portion of the banknote;

imaging means for detecting light reflected or transmitted by the banknote at least one wavelength;

said imaging means generating at least one image representing said portion from said reflected or transmitted light;

characterised in that a note path is provided along which the banknote to be validated is passed to expose a plurality of portions of the banknote to the illuminating light via said aperture when each of said portions is presented to the aperture; and wherein the imaging means generate an image for each of the portions and processing means are provided to combine the images to create a representation of the banknote, and the representation is a three dimensional matrix in which the coordinates of the matrix relate to a longitudinal coordinate of the banknote, the wavelength range, and the intensity of the light detected.

2. Apparatus according to claim 1 wherein the representation is a three dimensional matrix in which two coordinates of the matrix relate to x and y coordinates of the banknote respectively and the third coordinate of the matrix relates to the intensity of a particular imaging wavelength.

3. Apparatus according to claim 1 wherein the banknote is moved substantially continuously along the note path past the aperture.

4. Apparatus according to claim 1 wherein the portions are imaged sequentially along the banknote.

5. Apparatus according to claim 1 wherein each portion is presented by a plurality of images which relate to a plurality of wavelengths detected for that portion.

6. Apparatus according to claim 1 wherein illumination optics are provided adjacent to and acting on the note path, to ensure a substantially uniform illumination of the aperture.

7. Apparatus according to claim 1 wherein the light source is a polychromatic light source.

8. Apparatus according to claim 1 wherein the images are generated at all wavelengths contained within the light source.

9. Apparatus according to claim 1 wherein the width of the aperture defines the minimum pixel size of the longitudinal direction of the spectrally imaged banknote.

10. Apparatus according to claim 1 wherein the aperture is an elongate slit.

11. Apparatus according to claim 1 wherein the aperture has a width of around 1 mm or less.

12. Apparatus according to claim 1 wherein the apparatus includes collection optics to collect the light that is reflected or transmitted from the banknote and re-focus it onto a diffractive element.

13. Apparatus according to claim 1 wherein the apparatus includes re-imaging optics to receive the light from the diffractive element and focus it onto the imaging means.

14. A method for checking the validity of a banknote, said method comprising the steps of:

transporting a banknote along a note path;

illuminating a portion of the banknote, via an aperture, with a plurality of wavelengths of light;

detecting light reflected or transmitted by the banknote at least one wavelength;

generating at least one image representing said portion from said reflected or transmitted light characterised in that the banknote is passed along a note path to expose a plurality of portions of the banknote to the illuminating light via said aperture; and wherein an image is generated for each of the portions, and the images are combined to create a representation of the banknote, and the representation is a three dimensional matrix in which two coordinates of the matrix relate to x and y coordinates of the banknote respectively and the third coordinate of the matrix relates to the intensity of a particular wavelength.

15. A method according to claim 14 wherein the representation is a three dimensional matrix in which the coordinates of the matrix relate to the longitudinal coordinate of the banknote, the wavelength spectral range detectable, and the intensity of the light detected.

* * * * *